ASA LITTLE.
Improvement in Planters and Cultivators.
No. 126,147.          Patented April 30, 1872.
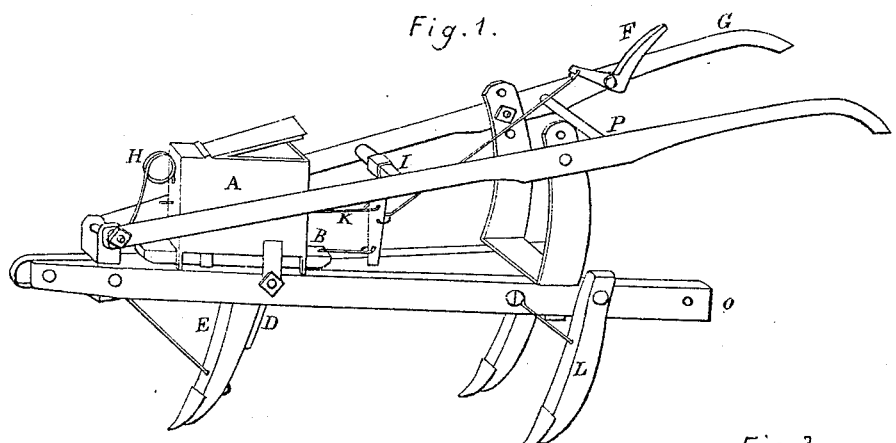
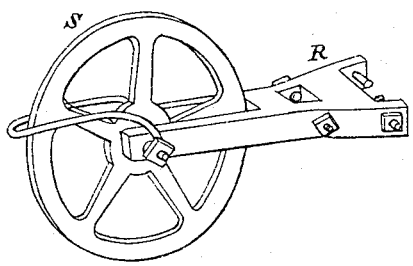
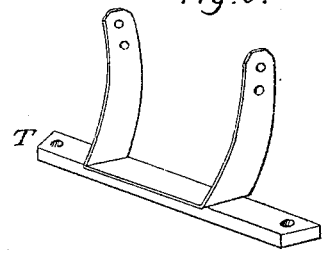
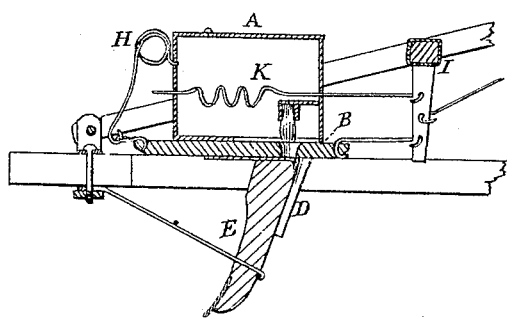
Witnesses.
  H. Howard
  Daniels
Asa Little, Inventor.
Chas. S. Whitman, Attorney 126,147

UNITED STATES PATENT OFFICE.

ASA LITTLE, OF JAMESTOWN, OHIO.

IMPROVEMENT IN PLANTERS AND CULTIVATORS.

Specification forming part of Letters Patent No. 126,147, dated April 30, 1872.

SPECIFICATION.

*To all whom it may concern:*

Be it known that I, ASA LITTLE, of Jamestown, in the county of Greene and in the State of Ohio, have invented an Improved Cultivator-Plow, Planter, and Furrower; and do hereby declare that the following description, taken in connection with the accompanying plate of drawing, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of agricultural implements which may be used either as a corn-planter, cultivator, or furrower, as may be preferred; and the nature thereof consists in certain improvements in the details of the construction of the same, hereinafter shown.

In the accompanying plate of drawing, which illustrates my invention and forms a part of the specification thereof, Figure 1 is a view, in perspective, illustrating the machine when the parts thereof are so arranged as to be used as a corn-planter. Fig. 2 illustrates the wheel made use of when the implement is used as a furrower. Fig. 3 represents the cross-bar used when the machine is transformed into a furrower; and Fig. 4, a detached portion, represented in section.

The construction, operation, and relative arrangement of the component parts of my invention are as follows:

In the drawing referred to, letter A designates the hopper or seed-box, provided with a valve, B, by means of which the corn is admitted to the throat D, attached to the forward standard E. The said valve is operated by the bell-crank F, pivoted to the handle G, and the spring H attached to the hopper. Secured to a strip projecting downward from the transverse shaft I is the wire K, which passes through apertures cut for its reception in the hopper, and stirs the corn within the same, thereby preventing clogging or packing.

In order to transform the machine from a planter to a cultivator the hopper A, bell-crank F, and shaft I are detached by releasing the bolts by which they are attached, and the standard L is removed to the rear end of the beam O.

When it is desirable to transform the machine into a furrower, the bolts binding together the beams O and holding the handle-rack P to the same are released and the said beams separated to allow the frame R of the wheel S to be introduced and secured between the ends thereof. The beams are held in position, when thus spread apart, by means of the cross-bar T, to which is attached the handle-rack.

Having described the construction and operation of my invention, I will state what I claim and desire to secure by Letters Patent in the following clause:

I claim the combination of the frame R, wheel S, beams O, and cross-bar T, whereby the machine may be converted from a cultivator to a furrower, as described.

In testimony that I claim the foregoing I have hereunto set my hand this 3d day of July, 1871.

ASA LITTLE.

Witnesses:
CYRUS QUINN,
JOHN L. QUINN.